(12) United States Patent
Park et al.

(10) Patent No.: US 10,093,554 B2
(45) Date of Patent: Oct. 9, 2018

(54) MULTIBUBBLE INJECTION TYPE DISSOLVED AIR FLOTATION WATER TREATMENT APPARATUS

(71) Applicant: DOOSAN HEAVY INDUSTRIES & CONSTRUCTION CO., LTD., Changwon-si, Gyeongsangnam-do (KR)

(72) Inventors: Yong Hae Park, Busan (KR); Byung Sung Park, Incheon (KR)

(73) Assignee: DOOSAN HEAVY INDUSTRIES & CONSTRUCTION CO., LTD., Changwon-si (KR)

( * ) Notice: Subject to any disclaimer, the term of this patent is extended or adjusted under 35 U.S.C. 154(b) by 203 days.

(21) Appl. No.: 15/042,487

(22) Filed: Feb. 12, 2016

(65) Prior Publication Data

US 2016/0326016 A1  Nov. 10, 2016

(30) Foreign Application Priority Data

May 4, 2015 (KR) .................. 10-2015-0062717

(51) Int. Cl.
*C02F 1/24* (2006.01)
*C02F 1/52* (2006.01)
(Continued)

(52) U.S. Cl.
CPC ............ *C02F 1/24* (2013.01); *B01D 21/0084* (2013.01); *B01D 21/01* (2013.01); *B03D 1/1431* (2013.01); *C02F 1/5209* (2013.01); *C02F 1/5281* (2013.01); *B03D 1/1412* (2013.01); *B03D 1/242* (2013.01); *B03D 2203/008* (2013.01); *C02F 1/44* (2013.01); *C02F 1/5236* (2013.01); *C02F 1/56* (2013.01); *C02F 2103/08* (2013.01); *C02F 2201/002* (2013.01); *C02F 2209/06* (2013.01)

(58) Field of Classification Search
CPC .. C02F 1/24; C02F 2201/002; C02F 2209/06; C02F 1/44; C02F 1/5236; C02F 1/5281; C02F 2103/08; C02F 1/56; B01D 21/0084; B01D 21/01; B03D 1/1412; B03D 1/1431; B03D 1/242
See application file for complete search history.

(56) References Cited

U.S. PATENT DOCUMENTS 2,242,139 A * 5/1941 Munroe ................ C02F 1/5281
                                                      210/202
2011/0192801 A1  8/2011 Jeanmarie et al.
2012/0193294 A1  8/2012 Amato et al.

FOREIGN PATENT DOCUMENTS

JP    2002-001011 A   1/2002
KR    10-0671047 B    1/2007
(Continued)

OTHER PUBLICATIONS

Communication dated Dec. 16, 2016 issued by the Korean Patent Office in counterpart application No. 10-2015-0062717.
(Continued)

*Primary Examiner* — Thomas M Lithgow
(74) *Attorney, Agent, or Firm* — Sughrue Mion, PLLC

(57) ABSTRACT

Disclosed herein is a multibubble injection type DAF (Dissolved Air Flotation) water treatment apparatus which supplies fine bubbles injected through injection of saturated water to a lower area of a separation zone as well as a lower area of a contact zone of a flotation basin, thereby improving removal efficiency of flocs.

13 Claims, 7 Drawing Sheets

(51) Int. Cl.
*B01D 21/00* (2006.01)
*B01D 21/01* (2006.01)
B03D 1/14 (2006.01)
B03D 1/24 (2006.01)
C02F 1/44 (2006.01)
C02F 103/08 (2006.01)
C02F 1/56 (2006.01)

(56) References Cited

FOREIGN PATENT DOCUMENTS

| | | |
|---|---|---|
| KR | 10-2011-0071481 A | 6/2011 |
| KR | 10-1095298 B1 | 12/2011 |
| KR | 10-2012-0132709 A | 8/2013 |
| WO | 2014/037334 A1 | 3/2014 |
| WO | 2014/044619 A1 | 3/2014 |
| WO | 2014/089443 A1 | 6/2014 |

OTHER PUBLICATIONS

Communication dated Aug. 3, 2016 issued by the European Patent Office in counterpart application No. 16155269.0.
Communication dated Jun. 7, 2016 issued by the Korean Patent Office in counterpart application No. 10-2015-0062717.

\* cited by examiner

MULTIBUBBLE INJECTION TYPE DISSOLVED AIR FLOTATION WATER TREATMENT APPARATUS

CROSS-REFERENCE TO RELATED APPLICATIONS

This application claims priority to Korean Application No. 10-2015-0062717 filed on May 4, 2015, the contents of which are incorporated herein in their entirety.

BACKGROUND

The present disclosure relates to a multibubble injection type DAF (Dissolved Air Flotation) water treatment apparatus, and more particularly, to a multibubble injection type DAF (Dissolved Air Flotation) water treatment apparatus which supplies fine bubbles injected through injection of saturated water to a lower area of a separation zone as well as a lower area of a contact zone of a flotation basin, thereby improving removal efficiency of flocs.

In general, a water treatment apparatus is an apparatus which produces fresh water using seawater to utilize the fresh water as water for living, eating or industrial use or properly treat raw water to purify waste water. Such a water treatment apparatus includes a device for removing foreign matters mixed in raw water.

As a unit process for removing foreign matters, there is DAF (Dissolved Air Flotation). The dissolved air flotation is a widely applied technology for various water treatment and sewage treatment processes or a pretreatment process for seawater desalination facilities. The dissolved air flotation is a technology of putting a coagulant, an aid coagulant, a pH regulator and so on in feed water to be treated in order to coagulate suspended particles, which is difficult to be removed through precipitation, such as alga and organic compounds, contained in feed water, injecting micro bubbles into the coagulated matters to combine the micro bubbles with the suspended particles, and floating and removing the suspended particles. In general, a DAF water treatment apparatus includes a mixing and coagulation basin (or a mixing basin), a flocculation basin and a flotation basin, and the flotation basin is divided into a contact zone and a separation zone.

Referring to FIG. 1, a related DAF water treatment apparatus will be described. First, when a coagulant is inserted into feed water to flocculate suspended particles of low density, which is contained in the feed water, in a mixing and coagulation basin 1.

"Floc" means a large mass that fine particles, such as suspended solids, organic matters and inorganic matters, contained in the raw water are flocculated by the coagulant, and generally means a collected thing formed by flocculation of particles of 0.1 μm or more. Flocs of a small size or density which cannot be removed through filtration or precipitation are floated onto the surface of water to be removed using the dissolved air flotation water treatment apparatus.

The flocs generated and grown up in the mixing and coagulation basin 1 flow into a flotation basin located at a rear end. The flocs flown into a contact zone 2 are floated to the surface of water by colliding and combining with fine bubbles injected from a lower part of the contact zone 2, and then, are removed through a scum removal device in a separation zone 3. In connection with the summary of the dissolved air flotation apparatus, please refer to FIG. 1 of U.S. Patent Publication No. 2012-0193294 entitled 'Dissolved gas flotation pressure reduction nozzle' published on Aug. 2, 2012.

The related DAF water treatment apparatus separates some of treated water which is an end product by a pipe and supplies compressed air of 4 to 7 bars to saturate the treated water. So, a rapid drop of pressure occurs, and then, micro bubbles are supplied to the contact zone 2 through a nozzle 4 mounted at the lower part of the contact zone 2.

In the meantime, formation and growing of the flocs in the mixing and coagulation basin 1 are influenced by raw water conditions, such as seawater temperature, polluted states and the containing degree of suspended matters, and coagulation conditions, such as stirring intensity, residence time and amounts of added chemicals. Accordingly, the flocs cannot perfectly develop in the mixing and coagulation basin 1, and hence, fine flocs are formed and cannot float properly or grow up into large flocs inside the separation zone 3 located at the downstream of the contact zone 2.

Because all of recycle flows in which compressed air is saturated are supplied only to the contact zone 2, the flocs which grow too late at the downstream of the mixing and coagulation basin 1 do not have a sufficient opportunity to come into contact with the micro bubbles and flow into the rear end of the system. Therefore, the related dissolved air flotation system has a disadvantage in that quality of the treated water is deteriorated and it has influences on the following processes.

BRIEF SUMMARY

Accordingly, the present disclosure has been made to solve the above-mentioned problems, and it is an object of the present disclosure to provide a multibubble injection type DAF (Dissolved Air Flotation) water treatment apparatus which can control some of micro bubbles to be supplied not only to a contact zone but also to a separation zone so that remaining flocs which are not in contact and are not combined with the micro bubbles at the contact zone and a bubble layer (an upper part of the separation zone) additionally come into contact with the micro bubbles in a lower part (below of the bubble layer) of the separation zone, thereby remarkably improving removal of the flocs.

To accomplish the above object, according to a first exemplary embodiment, there is provided a multibubble injection type DAF (Dissolved Air Flotation) water treatment apparatus for removing suspended particles contained in feed water to be treated, the multibubble injection type water treatment apparatus including: a mixing and coagulation basin for stirring a coagulant and feed water when the coagulant is injected into the feed water so as to form and grow up flocs through coagulation of suspended particles; a flotation basin for injecting micro bubbles and making the micro bubbles get in contact with the flocs contained in the feed water to form a combined body, raising the combined body to the surface of water and removing the combined body; and micro bubble distributing means having one or more nozzles for receiving saturated water, in which air is saturated, through a saturated water supply pipe in order to spray the saturated water into the flotation basin, wherein the flotation basin is divided into a contact zone, in which the injected micro bubbles and the flocs come into contact with each other, and a separation zone, which removes the combined body rising to the surface of water and discharges treated water to the rear end, by a partition upwardly extending from the bottom surface of the flotation basin, and the micro bubbles injected through the micro bubble distributing means are supplied to the contact zone and the separation zone.

In this instance, according to a first exemplary embodiment, nozzles are respectively mounted at a lower part of the contact zone and a lower part of the separation zone, the saturated water is supplied to the nozzles through the saturated water supply pipe, and the micro bubbles are injected to the contact zone and the separation zone.

Moreover, according to a second exemplary embodiment, the nozzle is disposed at the lower part of the contact zone, the partition has a wing part which upwardly extends toward the contact zone at a predetermined distance spaced apart from the bottom end of the partition and an outer end of the wing part is located above a spray hole of the nozzle, so that some of the micro bubbles injected through the nozzle are guided to the separation zone by the wing part.

In this instance, a plurality of first communication holes are formed from the portion that the wing part is formed to the bottom end of the partition in order to communicate with the separation zone, and the degree of opening of the first communication holes is controlled by first stoppers.

Furthermore, one or more first turbulence partitions are formed protrudingly from the wing part or the partition, on which the first communication holes are formed, in a micro bubble stay zone surrounded by the wing part and the partition having the first communication holes.

Additionally, according to a third exemplary embodiment, a two-way nozzle which has spray holes formed in two ways to spray the saturated water to the contact zone and the separation zone is mounted on the partition in order to inject micro bubbles to the contact zone and the separation zone.

In addition, according to a fourth exemplary embodiment, the micro bubble distributing means includes a container disposed on the bottom of the flotation basin, the upper face of the container becomes the bottom face of the flotation basin and is partitioned into a face exposed toward the contact zone and a face exposed toward the separation zone, and the container has a plurality of second communication holes formed on the upper face thereof, so that the micro bubbles injected from the nozzle mounted at the lower part of the container are supplied to the contact zone and the separation zone through the second communication holes.

In this instance, the degree of opening of the second communication holes formed on the upper face of the container is controlled by second stoppers, and one or more second turbulence partitions are formed protrudingly from an inner wall of the container, inside the micro bubble stay zone of the container.

In the meantime, the mixing and coagulation basin includes: a first mixing and coagulation part which is filled with first turbulence derivatives to generate high speed turbulence to first form flocs in the raw water; and a second mixing and coagulation part which is filled with second turbulence derivatives to generate turbulence slower than the turbulence of the first mixing and coagulation part so as to grow up the flocs in the raw water passing the first mixing and coagulation part.

In this instance, the mixing and coagulation basin further includes a porous separation membrane for partitioning the first mixing and coagulation part from the second mixing and coagulation part in order to maintain different turbulence intensities between the first mixing and coagulation part and the second mixing and coagulation part.

Moreover, the first turbulence derivatives are mesh-type materials which are stacked manifold or a plurality of fiber aggregates which get tangled together, and the second turbulence derivatives are a plurality of pall ring type materials.

In the meantime, the multibubble injection type DAF water treatment apparatus further includes a micro bubble forming part for forming saturated water using some of the feed water at the upstream side of the mixing and coagulation basin and supplying the saturated water to the nozzle through the saturated water supply pipe.

In this instance, the micro bubble forming part includes: an intake pipe for supplying air to the separated feed water; a mixing pump for forcedly transferring the supplied air and the feed water; and a saturator for saturating the supplied air in the transferred feed water.

Furthermore, the micro bubble forming part further includes a supplement injection part for supplying a supplement to make the formed micro bubbles have positive charges, and the supplement injection part is disposed on an upstream side pipe (a) of the intake pipe, a pipe (b) between the intake pipe and the mixing pump or a pipe (c) between the mixing pump and the saturator.

Additionally, the micro bubble forming part further includes a strainer for removing solids through pretreatment of the separated feed water.

As described above, the multibubble injection type DAF water treatment apparatus can supply some of micro bubbles not only to the contact zone but also to the separation zone so that the flocs which are not combined with the micro bubbles at the contact zone and the bubble layer can come into contact with the micro bubbles in the separation zone below the bubble layer, thereby remarkably improving removal of the flocs.

BRIEF DESCRIPTION OF THE DRAWINGS

The above and/or other aspects of the disclosure will become apparent and more readily appreciated from the following description of the embodiments, taken in conjunction with the accompanying drawings of which.

DETAILED DESCRIPTION

Figure 1:
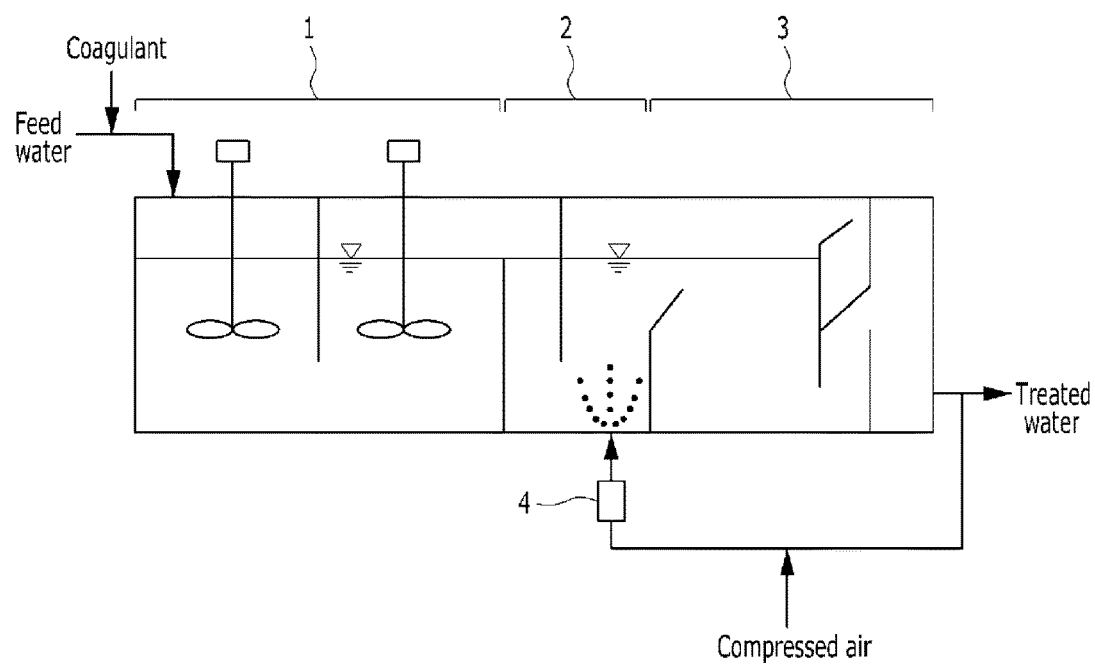
FIG. 1 is a schematic diagram of a related DAF (Dissolved Air Flotation) water treatment apparatus.

Reference will be now made in detail to embodiments of the present disclosure with reference to the attached drawings. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the disclosure.

The present disclosure provides a DAF (Dissolved Air Flotation) water treatment apparatus (A) which includes a mixing and coagulation basin 10, a flotation basin 20 divided into a contact zone 21 and a separation zone 22, and micro bubble distributing means 30 having a nozzle 31 for supplying micro bubbles into the flotation basin 20 in order to remove suspended particles contained in feed water to be treated.

The mixing and coagulation basin 10 in the water treatment apparatus (A) is a unit for stirring a coagulant and feed water when the coagulant is injected into the feed water so as to form and grow up flocs through coagulation of suspended particles, and the flotation basin 20 is a unit for making the flocs grown in the feed water get in contact with the micro bubbles to form a combined body, raising the combined body to the surface of water and removing the combined body.

As described above, in the related water treatment apparatus, because immature flocs do not come into contact with the micro bubbles due to the micro bubbles restrictively injected only to the contact zone 21 and grow up at the rear end or are turned into fine flocs, it has a bad influence on a rear end unit. Therefore, in order to solve the problem, the main technical feature of the water treatment apparatus according to the present disclosure is to induce the micro bubbles to be injected not only to the contact zone 21 but also to the separation zone 22 through the micro bubble distributing means 30.

Therefore, the water treatment apparatus according to the present disclosure can guarantee quality of the treated water stably even though forming and growing conditions of the flocs are changed according to various conditions, such as stirring intensity, seawater temperature or residence time, because the water treatment apparatus can effectively float and remove the flocs which are not removed in the contact zone 21 or the bubble layer which is an upper part of the separation zone 22.

The micro bubble distributing means 30 includes: saturated water supplying means 32 (such as a supply pipe) for supplying saturated water, in which air is saturated, from the outside; and one or more nozzles 31 which receives the saturated water through the saturated water supplying means to spray the saturated water into the flotation basin 20. The micro bubble distributing means 30 can supply micro bubbles to the contact zone 21 and the separation zone 22 in various acceptable forms. Hereinafter, exemplary embodiments of the various forms will be described in detail.

Now, a multiple-effect desalination system which partially injects acid into a partial effect container of high temperature and a desalination method using the same according to an exemplary embodiment will be described. However, the embodiment does not present all technical ideas of the present disclosure. Therefore, it will be understood by those of ordinary skill in the art that there may be various equivalences and modifications at the time that the present disclosure has been filed.

Example I

Figure 2:
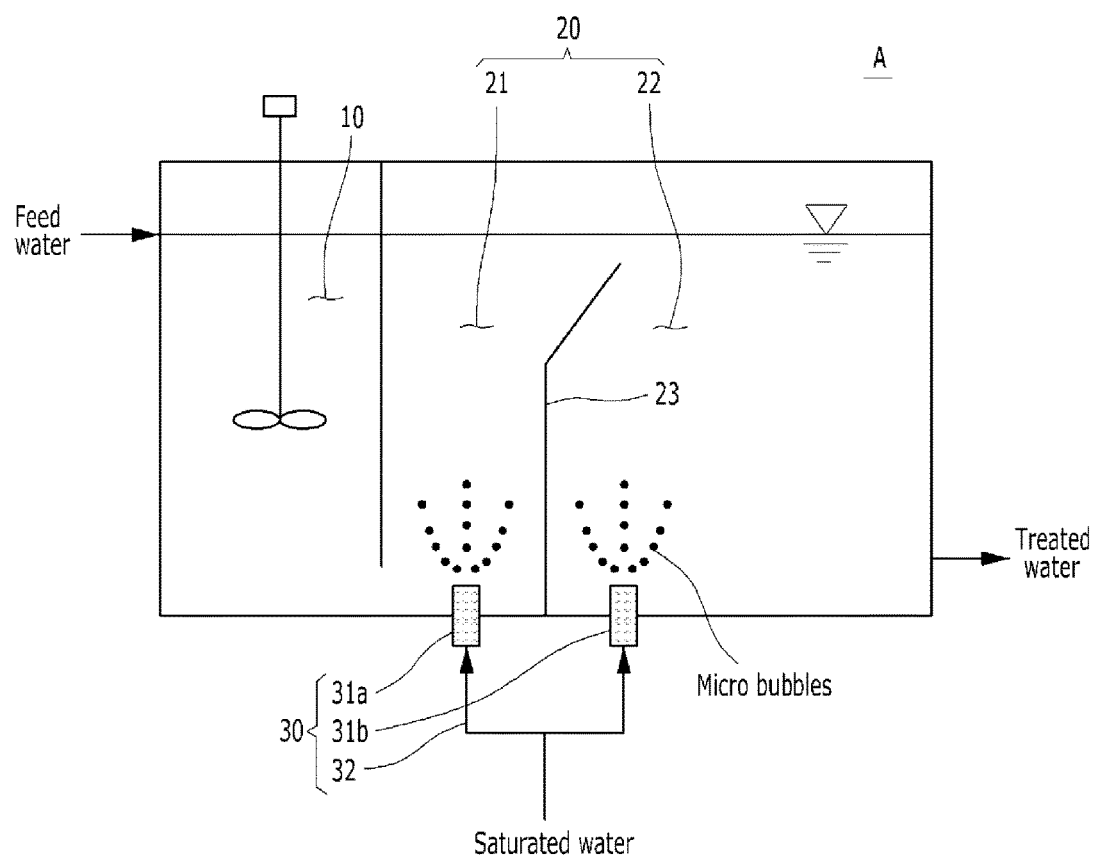
FIG. 2 is a schematic diagram of a DAF (Dissolved Air Flotation) water treatment apparatus according to a first exemplary embodiment.

The water treatment apparatus according to a first exemplary embodiment includes separate type nozzles 31a and 31b which are respectively mounted at the lower part of the contact zone 21 and the lower part of the separation zone 22 in order to spray the saturated water supplied through the saturated water supplying means 32, and it is illustrated in FIG. 2.

Because the nozzles 31 are respectively installed to the contact zone 21 and the separation zone 22, installation costs are increased, but it has several advantages in that it is easy to compensate problems of the conventional DAF apparatus which has the nozzle mounted only to the contact zone 22 and in that it is convenient to control operation of the nozzles 31 individually.

Example II Wing Part Extending from Partition

Figure 3:
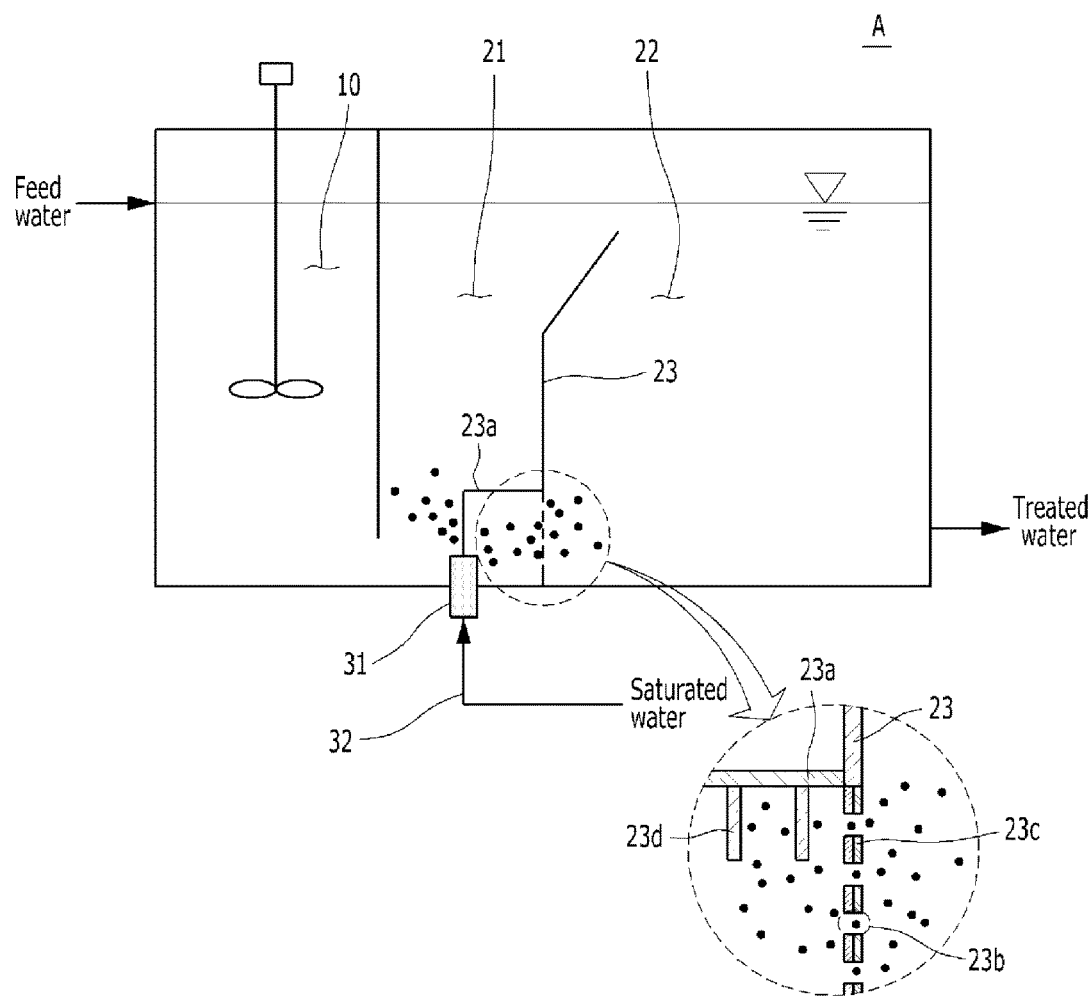
FIG. 3 is a schematic diagram of a DAF water treatment apparatus according to a second exemplary embodiment.

The water treatment apparatus according to a second exemplary embodiment includes a wing part 23a which protrudes toward the contact zone 21 at a predetermined height of a partition 23 upwardly extending from the bottom of the flotation basin 20 partitioning the contact zone 21 and the separation zone 22. An outer end portion of the wing part 23a is located above a spray hole of the nozzle 31 mounted at the lower part of the contact zone 21, so that some of the micro bubbles sprayed from the nozzle 31 collide against the wing part 23a and are guided to the separation zone 22. It is illustrated in FIG. 3.

The water treatment apparatus according to this example can supply micro bubbles to the contact zone 21 and the separation zone 22 using the single nozzle 31, and induce the micro bubbles of a proper amount toward the separation zone 22 because the outer end portion of the wing part 23a is properly mounted to be located above the spray hole of the nozzle 31 or is disposed to be controlled during operation.

In this instance, a plurality of first communication holes 23b are formed from the portion that the wing part 23a extends to the bottom end of the partition 23 in order to communicate with the separation zone 22, so that the micro bubbles guided through the wing part 23a can flow into the separation zone 22. More preferably, first stoppers 23c which can control the degree of opening of the first communication holes 23b may be disposed on the partition 23 having the first communication holes 23b. Preferably, a panel having holes corresponding with the first communication holes 23b is combined side by side with the partition 23 having the first communication holes 23b in such a way as to move parallel with the partition 23, so that the degree of opening of the first communication holes 23b can be controlled when the congruence degree between the holes formed in the panel and the first communication holes 23b is controlled.

Moreover, in order to generate micro bubbles more effectively by forming turbulence when the saturated water is sprayed onto a micro bubble stay zone (S) surrounded by the partition 23 having the first communication holes 23b, the wing part 23a and the bottom of the flotation basin 20 through the nozzle 31, one or more first turbulence partitions 23d may protrude from the partition 23 or the wing part 23a.

Example III Installation of Two-Way Nozzle on Partition

Figure 4:
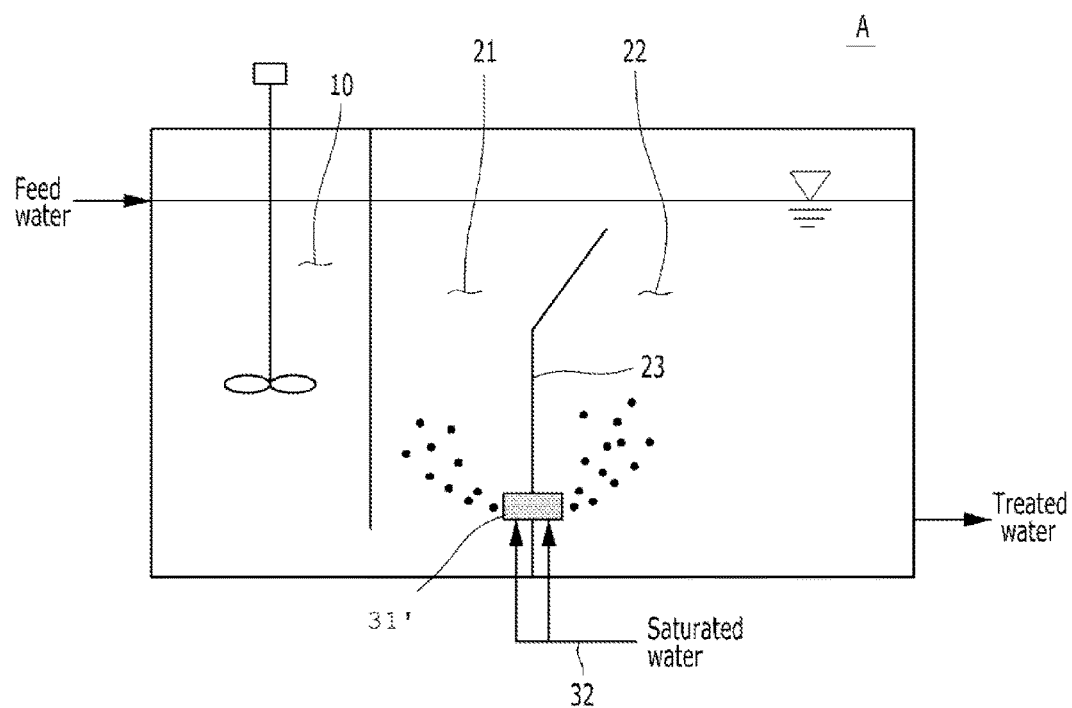
FIG. 4 is a schematic diagram of a DAF water treatment apparatus according to a third exemplary embodiment.

The water treatment apparatus according to a third exemplary embodiment includes a two-way nozzle 31' which has spray holes formed in two directions and is mounted at a predetermined height of the partition 23 upwardly extending from the bottom of the flotation basin 20 which partitions the contact zone 21 and the separation zone 22 in order to spray the saturated water to the contact zone 21 and the separation zone 22, so that micro bubbles can be supplied to the contact zone 21 and the separation zone 22, and it is illustrated in FIG. 4.

The water treatment apparatus according to the third exemplary embodiment can supply micro bubbles also to the separation zone 22 through the single nozzle like the water treatment apparatus according to the second exemplary embodiment, and can control the amount or quality of micro bubbles supplied to the contact zone 21 or the separation zone 22 more easily by directly controlling the sprayed state through the two-way nozzle 31' like the water treatment apparatus according to the first exemplary embodiment.

Furthermore, not shown in FIG. 4, but the water treatment apparatus according to the third exemplary embodiment may additionally have means for controlling the height of the nozzle 31' mounted on the partition 23 in order to control positions of the micro bubbles supplied from the nozzle 31' during operation.

Example IV Installation of Porous Container on Lower Part of Partition

Figure 5:
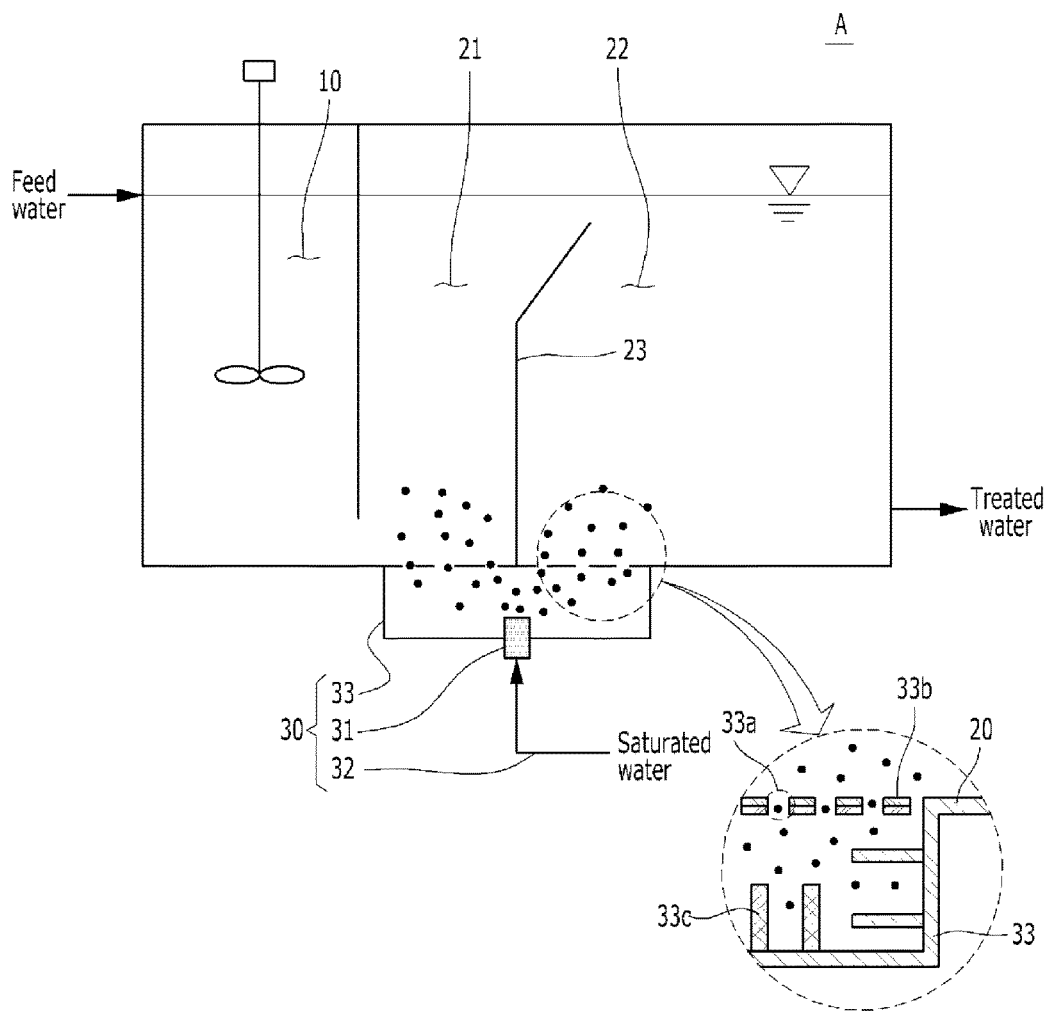
FIG. 5 is a schematic diagram of a DAF water treatment apparatus according to a fourth exemplary embodiment.

The water treatment apparatus according to the fourth exemplary embodiment includes porous container type micro bubble distributing means 30 disposed on the lower part of the partition 23 upwardly extending from the bottom of the flotation basin 20 which partitions the contact zone 21 and the separation zone 22, and it is illustrated in FIG. 5.

In detail, the micro bubble distributing means 30 according to this embodiment may include a container 33 disposed on the bottom of the flotation basin 20. The upper face of the container 33 may become the bottom face of the flotation basin 20 in which the partition 23 is mounted, and the upper face of the container 33 may be partitioned into a face exposed toward the contact zone 21 and a face exposed toward the separation zone 22.

In the meantime, the container 33 has a plurality of second communication holes 33a formed in the upper face thereof, so that the micro bubbles injected from the nozzle 31 mounted at the lower part of the container 33 can be supplied to the contact zone 21 and the separation zone 22 through the second communication holes 33a.

In this instance, more preferably, the container 33 may further include a second stopper 33b disposed on the upper face of the container 33, which has the second communication holes 33a, to control the degree of opening of the second communication holes 33a. Preferably, a panel having holes corresponding with the second communication holes 33a is combined side by side with the upper face of the container 33 having the second communication holes 33a in such a way as to move parallel with the upper face of the container 33, so that the degree of opening of the second communication holes 33a can be controlled when the congruence degree between the holes formed in the panel and the second communication holes 33a is controlled.

Additionally, in order to generate micro bubbles more effectively by forming turbulence when the saturated water is sprayed onto the micro bubble stay zone (S), which is the inner area, surrounded by a body of the container 33, one or more second turbulence partitions 33c may protrude from an inner wall(s) of the container 33.

Furthermore, not shown in FIG. 5, but the entire of the container 33 to which the nozzle 31 is combined may move laterally in parallel with the bottom face of the flotation basin 20 at the lower part of the flotation basin 20, so that the exposure degree of the upper face of the container 33 toward the contact zone 21 or the separation zone 22 can be controlled. Therefore, the water treatment apparatus according to the fourth exemplary embodiment can control the amount of the micro bubbles supplied to the contact zone and the separation zone.

Example V Nonpowered Mixing and Coagulation Basin Including First and Second Mixing and Coagulation Parts with Different Turbulence Intensities In place of the conventional mixing basin and the conventional flocculation basin which are separately and independently mounted, the water treatment apparatus according to a fifth exemplary embodiment may include a nonpowered mixing and coagulation basin 10 having first and second mixing and coagulation parts with different turbulence intensities.

Figure 6:
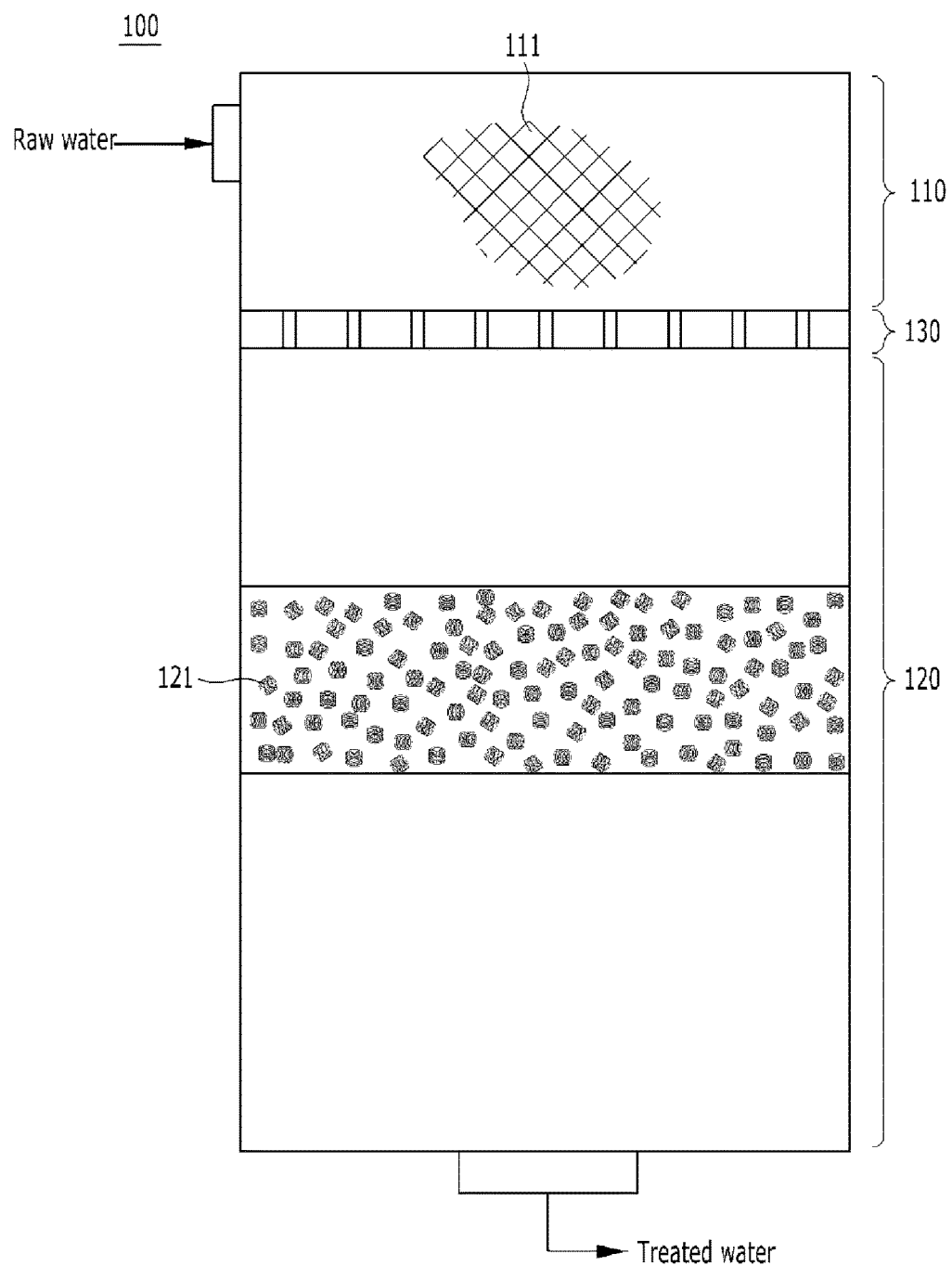
FIG. 6 is a schematic diagram of a DAF water treatment apparatus according to a fifth exemplary embodiment.

FIG. 6 is a mimetic diagram showing a nonpowered mixing and coagulation basin 100 according to an embodiment. In more detail, in order to substitute for functions of the conventional mechanical mixing and coagulation basin, the nonpowered mixing and coagulation basin for coagulating a coagulant injected into raw water and particles contained in the raw water to form and grow up flocs includes: a first mixing and coagulation part 110 which is filled with first turbulence derivatives 111 to generate high speed turbulence to first form flocs in the raw water; and a second mixing and coagulation part 120 which is filled with second turbulence derivatives 121 to generate turbulence slower than the turbulence of the first mixing and coagulation part 110 so as to second grow the flocs in the raw water passing the first mixing and coagulation part 110, so that the particles contained in the raw water are coagulated into a predetermined size by coming into contact with the coagulant while circulating inside the mixing and coagulation basin by turbulent flows without any stirring power.

The nonpowered mixing and coagulation basin 100 further includes a porous separation membrane 120 for partitioning the first mixing and coagulation part 110 from the second mixing and coagulation part 120 in order to maintain different turbulence intensities between the first mixing and coagulation part 110 and the second mixing and coagulation part 120.

First, the first mixing and coagulation part 110 is a watertight space to form flocs while the particles contained in the raw water are circulated by turbulent flows generated when the raw water flowing into the first mixing and coagulation part 110 passes the first turbulent derivatives 111, and has an inflow pipe disposed at the upper side thereof to make the raw water flow in.

The raw water flowing through the inflow pipe in the form of a straight flow forms a high-speed turbulence while passing the first turbulent derivatives 111 charged in the first mixing and coagulation part 110, and the particles contained in the raw water and the coagulant come into contact with each other by the turbulence so as to form flocs. The first turbulent derivatives 111 are mesh-type materials which are stacked manifold or a plurality of fiber aggregates which get tangled together, and preferably, may be stacked asymmetrically not to vertically coincide pores with each other between the mesh-type material having pores and the neighboring mesh-type material. Because the pores of the mesh-type materials are stacked asymmetrically in the vertical direction, the filter media according to the present disclosure can generate turbulences by gravity while the raw water passes the mesh-type materials and control the speed of turbulences generated according to sizes of the pores.

The second mixing and coagulation part is a space for growing the flocs contained in the raw water due to a slow-speed turbulence generated when the treated water passing the first mixing and coagulation part 110 passes the second turbulent derivatives 121, and includes a treated water discharge pipe mounted at the lower side for discharging the treated water in which the flocs are contained.

The second turbulent derivatives 121 has the form that is filled with a plurality of pall ring type materials, preferably, may be formed by a plurality of separate stages filled with the plural pall ring type materials which are stacked in multilayers.

The second mixing and coagulation part 120 of the nonpowered mixing and coagulation basin 100 according to the present disclosure can regulate the number of the stages of the separated type, which are respectively filled with the pall ring type materials, according to conditions of the raw water. It is preferable that the stages be disposed to get smaller in packing density of the pall ring type materials toward the downstream side. The reason is that it can make the flocs bigger because turbulence speed gets slower when packing density gets lower.

The separation membrane 120 is to partition the first mixing and coagulation part 110 from the second mixing and coagulation part 120 in order to maintain different turbulence speeds between the first mixing and coagulation part 110 and the second mixing and coagulation part 120. The first mixing and coagulation part generates rapid-speed turbulence and the second mixing and coagulation part 120 generates slow-speed turbulence to form and grow up the flocs by coagulating the particles contained in the raw water. There is no special limit in speed of the rapid-speed turbulence or slow-speed turbulence and the difference in speed of turbulences is caused by a relative difference in turbulence intensity inside the mixing and coagulation basin.

Therefore, in the nonpowered mixing and coagulation basin according to the present disclosure, the first mixing and coagulation part 110 is disposed above the second mixing and coagulation part 120, so that the raw water put in the first mixing and coagulation part generates rapid-speed turbulence while passing the first turbulent derivatives 111 to first form flocs. After that, the raw water goes through the pores of the separation membrane 130 by gravity, and grows up the flocs formed in the first mixing and coagulation part due to slow-speed turbulence formed while passing a plurality of the stages filled with the second turbulent derivatives 121 of the second mixing and coagulation part.

As described above, the dissolved air flotation apparatus which includes the mixing and coagulation basin for coagulating foreign matters by injecting the coagulant into the raw water and the flotation basin for floating and removing the flocs by injecting micro bubbles into the raw water may further include the nonpowered mixing and coagulation basin which includes: the first mixing and coagulation part 110 filled with first turbulence derivatives 111 to generate high speed turbulence to form flocs in the raw water; and the second mixing and coagulation part 120 filled with second turbulence derivatives 121 to generate turbulence slower than the turbulence of the first mixing and coagulation part 110 so as to grow the flocs in the raw water passing the first mixing and coagulation part 110. The nonpowered mixing and coagulation basin 100 is disposed at the front end of the flotation basin 20.

Moreover, in order to sufficiently grow the flocs in the raw water passing through the mixing and coagulation basin according to conditions of the raw water, the dissolved air flotation apparatus may further include: an additional coagulation basin (not shown) which has an agitator mounted between the mixing and coagulation basin 100 and the flotation basin 20; and a bypass channel (not shown) to directly transfer the flocs from the first mixing and coagulation part 110 to the additional coagulation basin.

The first mixing and coagulation part 110 is disposed above the second mixing and coagulation part 130, so that the raw water put in the first mixing and coagulation part passes the second mixing and coagulation part by gravity.

The dissolved air flotation apparatus having the nonpowered mixing and coagulation basin according to the present disclosure can regulate the number of the plural stages of the second mixing and coagulation part 120 or control the flow through the bypass channel and the agitator according to the conditions of the raw water requiring water treatment. In more detail, in a case that the additional coagulation basin is needed in order to increase coagulation efficiency of the flocs, the agitator included in the additional coagulation basin is operated, and then, a first flow to direct the flotation basin 20 through the second mixing and coagulation part 120 and the additional coagulation basin from the first mixing and coagulation part 110 and a second flow to direct the flotation basin 20 through the bypass channel and the additional coagulation basin from the first mixing and coagulation part 110 are selectively controlled. In a case that the additional coagulation basin is not needed, the agitator is stopped, and then, a third flow to direct the flotation basin 20 through the second mixing and coagulation part 120 from the first mixing and coagulation part 110 and a fourth flow to direct the flotation basin 20 through the bypass channel from the first mixing and coagulation part 110 are selectively controlled.

Therefore, the flow of the treated water can be selectively controlled into the first flow to the fourth flow according to conditions of the raw water, temporary problems and situations, so that operating costs can be reduced.

Example VI

Figure 7:
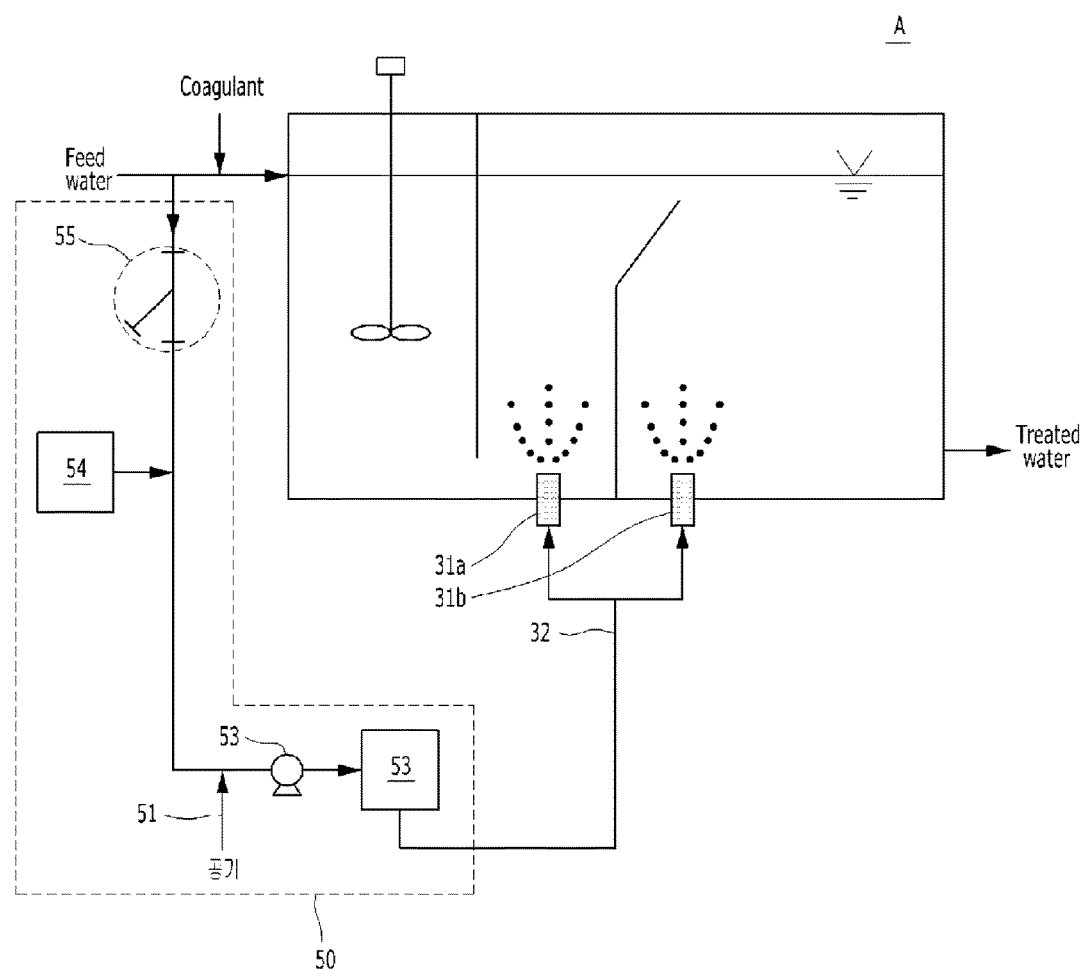
FIG. 7 is a schematic diagram of a DAF water treatment apparatus according to a sixth exemplary embodiment.

In general, the DAF water treatment apparatus separate some of the treated water which is discharged finally, generates saturated water by injecting compressed air, and then, sprays the saturated water to the separation zone through the nozzle. However, the water treatment apparatus according to a sixth exemplary embodiment generates saturated water not using treated water but using some of feed water of the upstream side and supplies micro bubbles to the separation zone, and it is illustrated in FIG. 7.

In general, because a flow rate of a recycle flow separated from treated water is about 10% to 20% of feed water and an amount of formed micro bubbles is increased as the flow rate of the recycle flow is increased, performance of the apparatus can be improved. However, if the flow rate of the recycle flow is increased, a flow velocity in the separation zone 22 is increased and the combined body between the flocs and the micro bubbles does not float and is discharged to the following process.

In the meantime, a surface loading rate which is a performance index of the dissolved air flotation apparatus was conventionally 5 m/hr to 15 m/hr which is slower than a theoretical bubble rise speed. Recently, high rate DAF apparatuses with a surface loading rate of 20 m/hr to 40 m/hr have appeared. However, because the surface loading rate is faster than the bubble rise speed, if the flotation basin 20 is designed in error, contaminants and bubbles are discharged together with the treated water and it may hit the following process. Furthermore, because micro bubbles are created using the recycle flow separated from the finally treated water, the substantive surface loading rate may fall short of the above-mentioned surface loading rate.

Therefore, the water treatment apparatus according to the present disclosure includes a micro bubble forming part 40 for forming micro bubbles by inducing and saturating air into water separated not from the finally treated water but from the initial feed water so as to enhance efficiency of the apparatus.

In detail, the micro bubble forming part 50 includes an intake pipe 51 for supplying air to the separated upstream side feed water; a mixing pump 53 for forcedly transferring the supplied air and the feed water; and a saturator 53 for saturating the supplied air in the transferred feed water.

A conventional saturator is a device for dissolving compressed air in treated water induced through a circulating pump. The conventional saturator has a water gathering space formed at a lower part thereof and an area above the water gathering space is filled with a filler, so that saturated water in which compressed air is dissolved is gathered in the water gathering space while the compressed air and water flow into the upper end of the saturator and pass through the filler.

Such a conventional saturator has a problem of biofouling because microorganisms are formed on the filler disposed in the saturator when air is supplied not to treated water but to feed water, and the problem is more critical in case of a saturator having a high and big pressure container in order to enhance efficiency.

Therefore, the present disclosure proposes a new saturator 53 with an improved inner structure which can use not treated water but feed water because solving the problem that saturation efficiency is reduced due to biofouling, does not use an air compressor, and can be operated at pressure of about 3 bar which is lower than pressure of the conventional saturator, 4 bar to 7 bar, so as to reduce operation costs.

Hereinafter, the saturator 53 according to the embodiment will be described in detail. The saturator 53 (not shown in the drawing) includes: a housing; a partition which extends in a vertical direction from an inner wall of one side of the housing but does not reach an inner wall of the other side so as to form a flow channel at the inner wall of the other side; and a plurality of fine pores formed in the partition. The saturator which adopts the inner partition structure induces a turbulent flow of the feed water flowing therein and air contained in the feed water, so that the air can be effectively saturated in the feed water even at relatively small operation pressure (about 3 bar) and it can prevent the problem of biofouling by generation of turbulence and can be operated without any air compressor.

Moreover, in order to easily induce electrostatic combination with the flocs formed in the feed water, because micro bubbles must have positive (+) charges, micro bubble ionizers of various types, such as electrolyzers for electrolysis may be adopted. Preferably, a supplement injection part 54 for supplying a supplement for ionization of micro bubbles may be added. As the supplement, there are ferric salt coagulants, aluminum-based coagulants, and so on.

In this instance, the supplement injection parts 54 may be disposed at various positions in order to supply the supplement to the feed water inside the pipe, preferably, disposed on an upstream side pipe of the intake pipe 51, on a pipe between the intake pipe 51 and the mixing pump 53 or on a pipe between the mixing pump 53 and the saturator 53.

In a case that the supplement is supplied to the separated initial feed water, the supplement can be naturally and uniformly mixed during an air supply process through the intake pipe 51 and during a forcedly transferring process through the mixing pump 53. Alternatively, in a case that the supplement is supplied on the pipe between the intake pipe 51 and the mixing pump 53 or on the pipe between the mixing pump 53 and the saturator 53, it is easy to control operations through control of the flow rate and pressure of the feed water.

Additionally, the water treatment apparatus according to the present disclosure may further include a strainer 55 for removing solids through pretreatment of the separated feed water of the upstream side. The strainer means devices for preventing foreign matters from being induced by removing solids contained in a fluid. In general, there are Y-type strainers and U-type strainers which uses a wire mesh container in a steam piping system or a water piping system. The strainer 55 is disposed at the upstream side from which the feed water is separated for first preprocessing the feed water in which lots of solids exist compared with treated water, in order to minimize bad influences on each process of the micro bubble forming processes at the rear end.

Example VII Results of Comparative Experiment

A comparative experiment for comparing performance of the DAF water treatment apparatus (A) which supplies micro bubbles not only to the contact zone 21 but also to the separation zone 22 according to the embodiment with performance of the conventional DAF water treatment apparatus which supplies micro bubbles only to the contact zone 21 was carried out. The comparative experiment was carried out at surface loading rate of 30 m/h, at recycle ratio of 10% and at pressure of 5 bar, and turbidities (NTU) and total suspended solids (mg/L) of feed water and treated water were measured in relation to the water treatment apparatus (A) according to the present disclosure and the conventional water treatment apparatus.

TABLE 1

|  |  | Conventional Device | Present Disclosure |
|---|---|---|---|
| Turbidity (NTU) | Feed water | 10.3 | 10.3 |
|  | Treated water | 4 | 2.4 |
| TSS (Total Suspended Solids) (mg/L) | Feed water | 21.6 | 21.6 |
|  | Treated water | 4 | 2 |

As seen from the table 1, the water treatment apparatus (A) according to the embodiment of the present disclosure was far better in removal efficiency of contaminants or flocs in feed water than the conventional water treatment apparatus because inducing immature fine flocs or immature flocs, which would grow up too late at the rear end, to additionally come into contact with the micro bubbles.

Further, the embodiments discussed have been presented by way of example only and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A multibubble injection type DAF (Dissolved Air Flotation) water treatment apparatus for removing suspended particles contained in feed water to be treated, the DAF water treatment apparatus comprising:
   a mixing and coagulation basin configured to stir a coagulant and feed water when the coagulant is injected into the feed water so as to form and grow up flocs through coagulation of suspended particles;
   a flotation basin configured to inject micro bubbles and make the micro bubbles contact with the flocs contained in the feed water to form a combined body, raise the combined body to the surface of water and remove the combined body; and
   micro bubble distributing means having one or more nozzles configured to receive saturated water, in which air is saturated, through a saturated water supply pipe in order to spray the saturated water into the flotation basin,
   wherein the flotation basin is divided into a contact zone, in which the injected micro bubbles and the flocs come into contact with each other, and a separation zone, which removes the combined body rising the surface of water and discharges treated water to a rear end, by a partition upwardly extending from a bottom surface of the flotation basin, and
   wherein the micro bubbles injected through the micro bubble distributing means are supplied to the contact zone and the separation zone,
   wherein the nozzle is disposed at the lower part of the contact zone, the partition has a wing part which upwardly extends toward the contact zone at a predetermined distance spaced apart from the bottom end of the partition and an outer end of the wing part is located above a spray hole of the nozzle, so that some of the micro bubbles injected through the nozzle are guided to the separation zone by the wing part,
   wherein a plurality of first communication holes are formed from the portion that the wing part is formed to the bottom end of the partition in order to communicate with the separation zone.

2. The multibubble injection type DAF water treatment apparatus according to claim 1, wherein a degree of opening of the first communication holes is controlled by first stoppers.

3. The multibubble injection type DAF water treatment apparatus according to claim 1, wherein one or more first turbulence partitions are formed protrudingly from the wing part or the partition, on which the first communication holes are formed, in a micro bubble stay zone surrounded by the wing part and the partition having the first communication holes.

4. A multibubble injection type DAF water treatment apparatus for removing suspended particles contained in feed water to be treated, the DAF water treatment apparatus comprising:
   a mixing and coagulation basin configured to stir a coagulant and feed water when the coagulant is injected into the feed water so as to form and grow up flocs through coagulation of suspended particles;
   a flotation basin configured to inject micro bubbles and make the micro bubbles contact with the flocs contained in the feed water to form a combined body, raise the combined body to the surface of water and remove the combined body; and
   micro bubble distributing means having one or more nozzles configured to receive saturated water, in which air is saturated, through a saturated water supply pipe in order to spray the saturated water into the flotation basin,
   wherein the flotation basin is divided into a contact zone, in which the injected micro bubbles and the flocs come into contact with each other, and a separation zone, which removes the combined body rising to the surface of water and discharges treated water to a rear end, by a partition upwardly extending from a bottom surface of the flotation basin, and
   wherein the micro bubbles injected through the micro bubble distributing means are supplied to the contact zone and the separation zone,
   wherein the micro bubble distributing means includes a container disposed on the bottom of the flotation basin,
   wherein an upper face of the container forms at least a part of the bottom face of the flotation basin and is partitioned into a face exposed toward the contact zone and a face exposed toward the separation zone, and
   wherein the container has a plurality of second communication holes formed on the upper face thereof, so that the micro bubbles injected from the nozzle mounted at the lower part of the container are supplied to the contact zone and the separation zone through the second communication holes.

5. The multibubble injection type DAF water treatment apparatus according to claim 4, wherein a degree of opening of the second communication holes formed on the upper face of the container is controlled by second stoppers.

6. The multibubble injection type DAF water treatment apparatus according to claim 4, wherein one or more second turbulence partitions are formed protrudingly from an inner wall of the container, inside the micro bubble stay zone of the container.

7. A multibubble injection type DAF water treatment apparatus for removing suspended particles contained in feed water to be treated, the DAF water treatment apparatus comprising:
   a mixing and coagulation basin configured to stir a coagulant and feed water when the coagulant is injected into the feed water so as to form and grow up flocs through coagulation of suspended particles;
   a flotation basin configured to inject micro bubbles and make the micro bubbles contact with the flocs contained in the feed water to form a combined body, raise the combined body to the surface of water and remove the combined body; and micro bubble distributing means having one or more nozzles configured to receive saturated water, in which air is saturated, through a saturated water supply pipe in order to spray the saturated water into the flotation basin, wherein the flotation basin is divided into a contact zone, in which the injected micro bubbles and the flocs come into contact with each other, and a separation zone, which removes the combined body rising to the surface of water and discharges treated water to a rear end, by a partition upwardly extending from a bottom surface of the flotation basin, and wherein the micro bubbles injected through the micro bubble distributing means are supplied to the contact zone and the separation zone, wherein the mixing and coagulation basin comprises:

a first mixing and coagulation part which is filled with first turbulence derivatives to generate high speed turbulence to first form flocs in the raw water; and a second mixing and coagulation part which is filled with second turbulence derivatives to generate turbulence slower than the turbulence of the first mixing and coagulation part so as to grow up the flocs in the raw water passing the first mixing and coagulation part.

8. The multibubble injection type DAF water treatment apparatus according to claim 7, wherein the mixing and coagulation basin further comprises a porous separation membrane configured to partition the first mixing and coagulation part from the second mixing and coagulation part in order to maintain different turbulence intensities between the first mixing and coagulation part and the second mixing and coagulation part.

9. The multibubble injection type DAF water treatment apparatus according to claim 7, wherein the first turbulence derivatives are mesh-type materials which are stacked manifold or a plurality of fiber aggregates configured to be tangled together, and the second turbulence derivatives are a plurality of pall ring type materials.

10. A multibubble injection type DAF water treatment apparatus for removing suspended particles contained in feed water to be treating, the DAF water treatment apparatus comprising:

a mixing and coagulation basin configured to stir a coagulant and feed water when the coagulant is injected into the feed water so as to form and grow up flocs through coagulation of suspended particles;

a flotation basin configured to inject micro bubbles and make the micro bubbles contact with the flocs contained in the feed water to form a combined body, raise the combined body to the surface of water and remove the combined body;

micro bubble distributing means having one or more nozzles configured to receive saturated water, in which air is saturated, through a saturated water supply pipe in order to spray the saturated water into the flotation basin, wherein the flotation basin is divided into a contact zone, in which the injected micro bubbles and the flocs come into contact with each other, and a separation zone, which removes the combined body rising to the surface of water and discharges treated water to a rear end, by a partition upwardly extending from a bottom surface of the flotation basin, and wherein the micro bubbles injected through the micro bubble distributing means are supplied to the contact zone and the separation zone, and a micro bubble forming part configured to form saturated water using some of the feed water at the upstream side of the mixing and coagulation basin and to supply the saturated water to the nozzle through the saturated water supply pipe.

11. The multibubble injection type DAF water treatment apparatus according to claim 10, wherein the micro bubble forming part comprises:

an intake pipe configured to supply air to the separated feed water;

a mixing pump configured to forcedly transfer the supplied air and the feed water; and a saturator configured to saturate the supplied air in the transferred feed water.

12. The multibubble injection type DAF water treatment apparatus according to claim 11, wherein the micro bubble forming part further comprises a supplement injection part configured to supply a supplement to make the formed micro bubbles have positive charges, and the supplement injection part is disposed on one of an upstream side pipe of the intake pipe, a pipe between the intake pipe and the mixing pump or a pipe between the mixing pump and the saturator.

13. The multibubble injection type DAF water treatment apparatus according to claim 10, wherein the micro bubble forming part further a strainer configured to remove solids through pretreatment of the separated feed water.

* * * * *